US007887066B2

(12) United States Patent
Knarvik

(10) Patent No.: US 7,887,066 B2
(45) Date of Patent: Feb. 15, 2011

(54) DEVICE FOR ACTIVITIES ON SNOW, WATER OR THE LIKE

(76) Inventor: Jonas Min Knarvik, Ola Narr 14, Oslo (NO) N-0563

( * ) Notice: Subject to any disclaimer, the term of this patent is extended or adjusted under 35 U.S.C. 154(b) by 218 days.

(21) Appl. No.: 10/595,760

(22) PCT Filed: Nov. 12, 2004

(86) PCT No.: PCT/NO2004/000345

§ 371 (c)(1),
(2), (4) Date: Jun. 1, 2006

(87) PCT Pub. No.: WO2005/047075

PCT Pub. Date: May 26, 2005

(65) Prior Publication Data

US 2007/0080532 A1     Apr. 12, 2007

(30) Foreign Application Priority Data

Nov. 12, 2003   (NO) .................................. 20035024

(51) Int. Cl.
*B62B 13/00* (2006.01)
(52) U.S. Cl. .......................................... 280/18; 441/65
(58) Field of Classification Search .................. 280/15, 280/18, 18.1, 19, 21.1, 24, 28, 28.14, 28.16; 441/65, 66, 69
See application file for complete search history.

(56) References Cited

U.S. PATENT DOCUMENTS 3,455,571 A * 7/1969 Dallera et al. .................. 280/18
3,937,482 A * 2/1976 Johnson ......................... 280/18
4,561,664 A * 12/1985 Cashmere ..................... 280/18
4,669,992 A * 6/1987 Morris .......................... 441/65
4,807,554 A * 2/1989 Chi-Hung .................... 114/345
4,928,983 A * 5/1990 Maass .......................... 280/18
5,083,955 A * 1/1992 Echols ......................... 441/65
5,713,773 A * 2/1998 Churchill ..................... 441/66
5,941,540 A    8/1999 O'Haire
6,171,161 B1 * 1/2001 Peterson ..................... 441/130
6,477,976 B2 * 11/2002 Van Gelder ................. 114/253
6,623,018 B2 * 9/2003 Fireman et al. ............... 280/18

FOREIGN PATENT DOCUMENTS

DE           2528842       1/1977
FR           2074372       1/1971
WO        WO 8704397       7/1987

* cited by examiner

*Primary Examiner*—Frank B Vanaman
(74) *Attorney, Agent, or Firm*—Christian D. Abel

(57) ABSTRACT

A device for use in activity on snow-covered surfaces, water or the like having a bottom board (1) for contact with the surface, longitudinal steering ribs on the underside and with upwardly curved faces at the front edge and preferably also at the rear edge. A top board (2) is adapted to the user and his position of use by the formation of well-like depressions along the side areas for the user's legs. On the top board (2) in the central region there is formed an elongate, trough-shaped depression (6) in which there is secured an airtight bag (3) that is adapted to the depression. The central portion (10) of the bottom board has at least one, preferably two central steering ribs/grooves (12). The front is equipped with fastening means (8) for a towing line or rope (17).

10 Claims, 4 Drawing Sheets

DEVICE FOR ACTIVITIES ON SNOW, WATER OR THE LIKE

FIELD OF THE INVENTION

The invention relates to a device for use in activity on a snow-covered surface, on water or also on another surface, comprising a bottom board for contact with the surface, equipped with elongate steering ribs on the underside and having upwardly curved faces at the front edge and preferably also at the rear edge, and a top board that is adapted to the user and his position of use by the formation of well-like depressions along the side areas for the user's legs and having an air bag for support of the user, wherein the bottom board and the top board are joined together along their edges and define a hollow space between them.

BACKGROUND OF THE INVENTION

Many different embodiments of so-called sports boards designed for use in sports activities and other leisure-time use are known. There are, for example, boards for use on snow or ice surfaces in the form of toboggans, sledges and devices equipped with skids.

Furthermore, different board types are known, generally of an inflatable nature, designed to be pulled behind a boat on water, where the user is quite simply towed behind the boat or has the possibility of riding some form of slalom.

Moreover, there are also board structures, also of the air cushion type, which can be used to sledge down, e.g., a grassy slope.

However, to date there have been no devices for active sports and leisure time use which are so designed that they are equally suitable for use on different types of surfaces, as for instance snow and water.

A snow covering and a water surface have very different properties, which will affect the propulsion of a vehicle moving on these surfaces. A sliding surface that is designed for turning on snow or a compressed snow cover will not work in the same way in an aquatic environment, where, for example, a steering rib will not be able to grip the surface, but instead will function by pushing water aside.

Examples of special boards for sledging can be found in Norwegian Patent No. 165098, which describes a board with a padded support for the user and with a groove on its underside to render the sledge steerable on snow surfaces. A design according to this patent would not be usable on water.

Examples of structures designed for use both on water and on snow are described in U.S. Pat. No. 4,732,399, DE Offenlegungsschrift 2528842 and WO-A1-87/04397. The device in U.S. Pat. No. 4,732,399 is made of an inflatable cushion, preferably in the form of an annular ring, with a covering member that surrounds and encloses the cushion. The device is not equipped with any steering grooves or the like and is purely intended for sledging down a slope or being towed behind a boat, and the object of the invention is quite simply that the user should sit comfortably on the air cushion, which naturally also forms the float at sea.

DE 2528842-A-1 teaches a sports device that is made of a rigid plate-shaped part and a flexible, inflatable part or cushion. The structure is primarily intended for use on snow surfaces and is made having a hard, plate-shaped top and an inflatable bottom, which also forms the sliding surface. This may be equipped with steering grooves, and to reduce wear may also be covered with a bottom shell or turned upside-down so that the hard part forms the sliding surface. A number of different embodiments based on this principle are described. When sledging on this board, the user sits on the air cushion with his legs facing forwards in a normal sitting position and can balance the board by leaning to the sides, thereby obtaining some control. For use on a water surface, the device according to the German document is modified. Paddles, for example, are mounted, and the user sitting on the board can propel himself forwards by turning the paddles that are arranged on a shaft which is passed through the board. The board is thus essentially suitable for leisure purposes at sea and must be modified to be capable of being used in the water.

WO-A1-87/04397 describes a device for use preferably in activity on a snow-covered surface, but which may also be used on water. The device has a bottom board with a slightly curved central portion, higher side portions and central steering grooves or ribs that extend over the whole length. The device further consists of a top board. The bottom board and the top board are joined together along their edges. Fastening means for a towing line, e.g., the hook on a ski lift, are also described. The user sits inside the device and steers by shifting his body weight. The top board may be shaped like a canoe. For alternative use in water, the canoe-shaped top board is secured to the bottom board in such manner that the canoe part can be removed. The device described in this document is not a universal board but a device that must be modified for use in water.

BRIEF SUMMARY OF THE INVENTION

The object of the present invention is to provide a universally usable board, which without any modification at all can be used actively and controllably on snow-covered surfaces as well as at sea, the board having good steering properties, almost equally good on both types of surface, without any form of modification. It is also an object to provide a board that is simple to produce and that can easily be transported and takes up minimum space during transport.

These objects are achieved by means of a board that is characterised by the features set forth in the patent claims.

The device according to the invention is constructed of three main elements, namely a bottom board, a top board and an air bag that is mounted on the top board and forms the support for the user. The board should be capable of being steered dynamically both at low and at high speeds and it is therefore important that the user is in a suitable position when he uses the device. The air bag is therefore made in the form of an elongate saddle which the users "rides" with his legs facing backwards, so that he is in a position in which he can easily tilt the board to the side for steering purposes by bending the upper part of his body. He is secured to the device by a form of "harness" that is fastened around the saddle-like air bag.

The underside of the board, i.e., the bottom board, is made having steering ribs and runners that are so positioned in relation to each other that they allow the board to be steered by body weight displacement on both types of surface. The special rounded shape and angular relation between steering ribs and steering skis (runners) and the design of the central portion and side face of the bottom board are thus of crucial importance in order to obtain the possibilities of universal use. Tests have shown that just small changes will have a major effect on the properties on at least one of the surfaces.

According to preferred embodiments, the hollow space between the boards is made having holes, which preferably are arranged at the end of the device. During use on water, the hollow space between the boards will be filled with water, so that the board will lie low in the sea and will also have a certain weight, which makes it easier for the user to balance on the air bag when he is pulled up out of the water in the plane position of the board. In the plane position, the hollow space will be emptied and the board will thus easily glide on the water surface. Furthermore, for use on water and optional towing on snow surfaces in flat areas, e.g., behind a snow scooter, it is of great importance to get started without the user being exposed to unduly large pulling forces. A special fastening mechanism has therefore been developed which is used when the device is set in motion and which can be released once the user is in the permanent environment of use. Other advantageous embodiment features are apparent from the detailed description and from the drawings and the patent claims.

BRIEF DESCRIPTION OF THE DRAWINGS

In the following, the invention will be described in detail by means of an exemplary embodiment that is illustrated in the drawings, wherein.

DETAILED DESCRIPTION OF THE INVENTION

Figure 1:
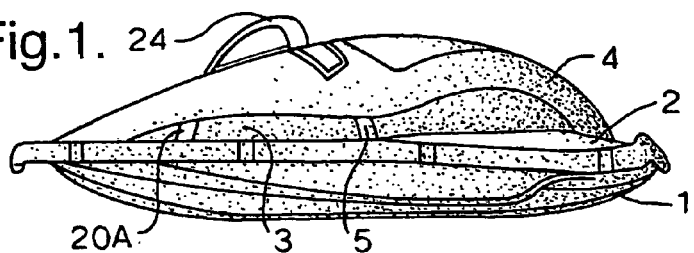
FIG. 1 is a side view of a device according to the invention that is ready for use.
Figure 2:
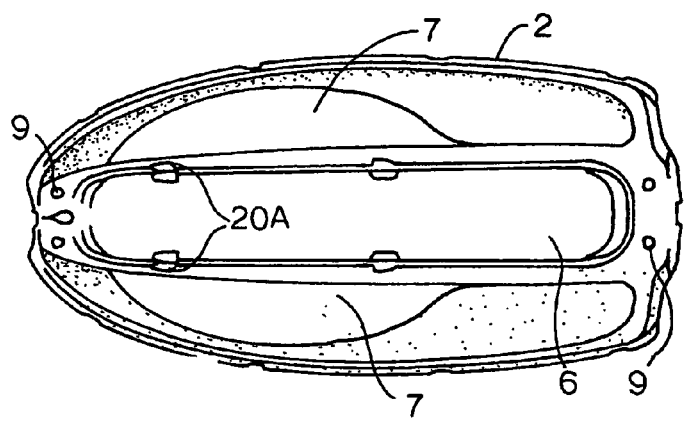
FIG. 2 is a top view of the top board of the device according to the invention.

FIG. 1 illustrates the device according to the invention when assembled. The device consists of three main parts, a bottom board 1, which is fastened to a top board 2, on which in the central area thereof is arranged an air bag 3. Fitted on the air bag is a saddle-like cover 4, which is described in more detail below. The air bag is secured by fastening means, e.g., straps 5 that are passed around the air bag and fastened to the top part 2, e.g., by being passed through slots 20A in the side edge thereof (FIG. 2). A holding means for the user is attached to the straps. The air bag can be inflated and deflated through a valve device 19 (FIG. 5).

FIG. 2 is a top view of the top board 2. The top board has a central depression 6 that is higher than the depressions in the side areas, and the air bag 3 is placed in this depression 6. Depressions having wells 7 for the user's legs are formed in the side areas. At the end of the board there are resting faces for the user's feet, as in a position of use he uses the air cushion 3 as a saddle on which he can sit with his knees in the wells 7 and his feet stretched out backwards.

Figure 3A:
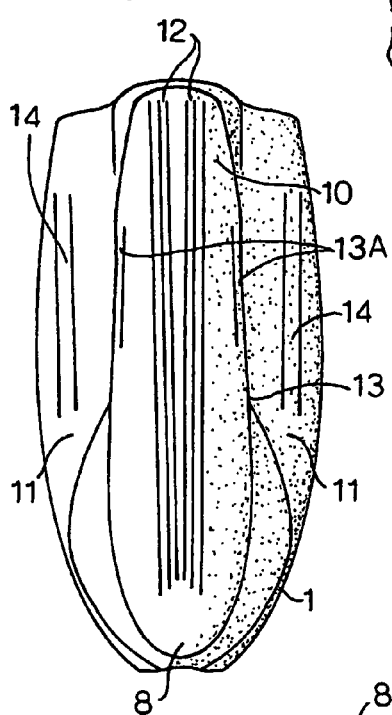
FIGS. 3A and 3B are bottom views of two variants of the bottom board.
Figure 3B:
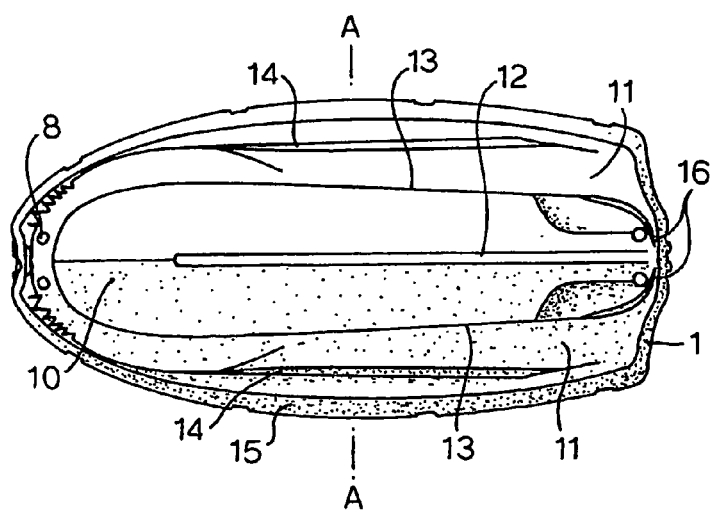
Figure 4A:
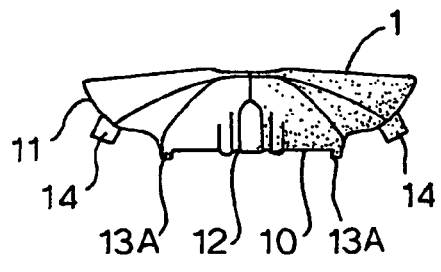
FIG. 4A is a front view of the bottom board in FIG. 3A.
Figure 4B:
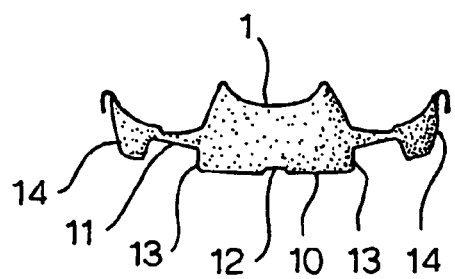
FIG. 4B is a sectional view taken along the line A-A of the bottom board in FIG. 3B.

FIG. 3A and FIG. 3B illustrate two variants of the underside of the bottom board that is to slide against the surface, and on which steering ribs/grooves and runners are arranged. The bottom board has a central portion 10 which primarily slides on the surface if there is snow. The central portion 10 has one or two central steering grooves 12 and a marked edge 13 at the junction with the side faces, as can be seen from FIGS. 4A and 4B. In FIG. 3A the steering grooves are formed as depressions in a raised flat area in the bottom face. At the edge 13 of the central portion, two steering ribs 13A may be formed in the longitudinal direction, as shown in FIG. 3A, which at least at their inner edge are parallel to the longitudinal axis of the board. The outer edges 13 of the central portion are, in the illustrated embodiment, bevelled in the longitudinal direction at an angle of between 1° and 10° relative to the central axis of the board, so that the central portion tapers in the backward direction. In the side faces 11 of the bottom board, on each side of the central portion 10, a steering runner 14 is provided, which is also constructed at an angle relative to the longitudinal axis of the board, but in this case at an angle that gives greater distance between the runners in the rear part of the board. The angle in this case will also be in the range of 1° to 10°. The steering runners extend over only a part of the length of the board. These runners 14 form with the outer edges 13 of the central portion, or the steering ribs 13A, the said angle of between 1° and 10°. The runners 14 are also angled outwards, as can be seen from FIGS. 4A and 4B, at an angle that can vary between 1° and 30°. It has been found that these angles are of importance for achieving maximum stability in use both on water and on snow surfaces, and help to ensure that the steering properties are extensively the same in both these situations. Other angles are also conceivable, possibly even parallel alignment of steering runners and steering ribs/edges/grooves, but this will cause a certain reduction in the steering properties and the stability of the propulsion.

Figure 5A:
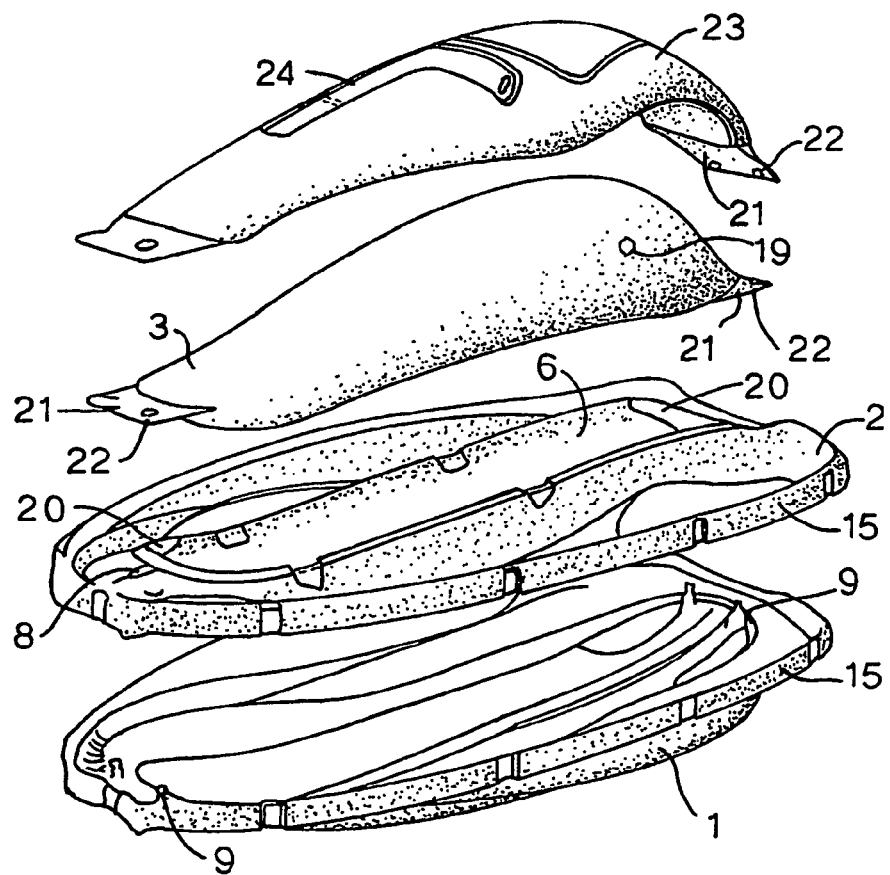
FIG. 5A is a perspective view illustrating the three main parts of the device according to the invention, and a suitable cover for fitting over the air bag, with the parts separated from each other.

FIG. 5A is a perspective view of the three main parts of the device according to the invention, separated from each other. Over these parts is shown the cover or covering 23 which advantageously is used as the sitting surface or "saddle" for the user. As can be seen from this figure, the air bag 3 has extensions at each end, which may be of the same material as the air bag or of a more rigid material. Holes 22 which are intended to cooperate with studs 9 in the bottom board are formed in these extensions 21. The extensions 21 are passed through slots 20 in the top board, whereupon the holes are passed over the studs 9 on the bottom board. On inflation, the air bag 3 will tighten this connection so that the bag is held securely in place after the top board and the bottom board have been fastened together. The fastening together of the top board and the bottom board can be done by riveting, which will allow replacement of the boards should they be damaged. Other fastening means may also used and will be a choice for the skilled person. There are connection flanges 15 along the peripheral edge.

Figure 5B:
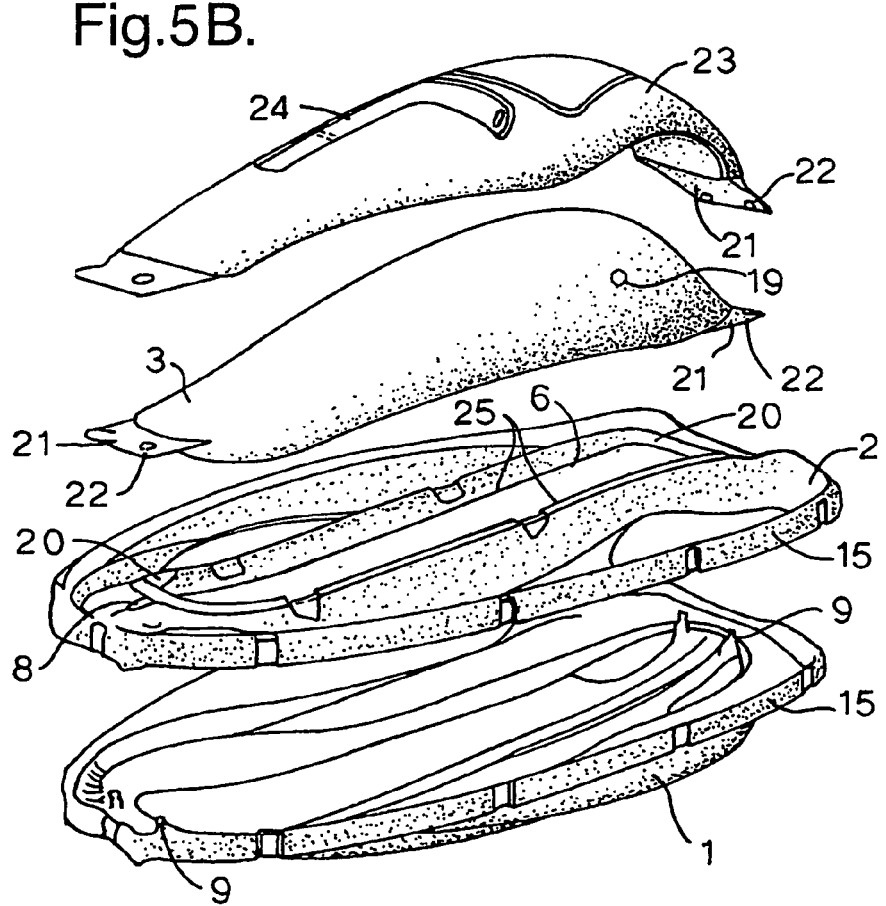
FIG. 5B is a view like that in FIG. 5A of an alternative embodiment.

An alternative embodiment is shown in FIG. 5B of the drawings. The difference is that the top board, instead of having a central depression 6 for the mounting of the air bag, has a similarly located cut-out 25, so that the air bag 3 rests on the bottom board in a corresponding depression 26. A solution of this kind may be appropriate for material-technical reasons. The air bag can be secured in the same way as before.

As mentioned above, it would be an advantage if the space between the boards 1 and 2 is filled with water during use in water, because this gives the board a lower centre of gravity and makes it easier for the user to get up on it. Such holes are indicated by the reference numeral 16 in FIG. 3B, but water will also be able to enter through the slots for the fastening straps and the slots for securing the holding means 21, 22. For draining during use at sea, it is however important that there are also such holes in the end area of the board.

The saddle-like cover 23, which preferably is padded, is placed for attachment over the air bag 3 and can be fastened in a similar way to the air bag by using extensions at the ends which are passed through the slots 20. This will be sufficient to hold the cover in place and tightening will cause the cover to fit tightly against the air bag 3, also at its side areas. To achieve this, a corresponding cutting to size of the cover may be carried out. The cover may also be fastened by means of holes on the studs 9 if this is desired as an extra fastening.

Fastening by means of studs is an expedient and practical fastening method, but other alternatives will of course also be possible.

The air bag is inflated and deflated through a valve 19, which is shown schematically in FIG. 5. The valve is located in an appropriate place. The possibility of emptying the air bag makes the device easier and more convenient to handle during transport. Mounted on the cover that is placed over the air bag is a holding strap arrangement 24 which the user holds on to when manoeuvring the device. The straps are also shown in a purely schematic manner and are fastened to the board system in a suitable manner, for example, combined with the straps 5.

Figure 7A:
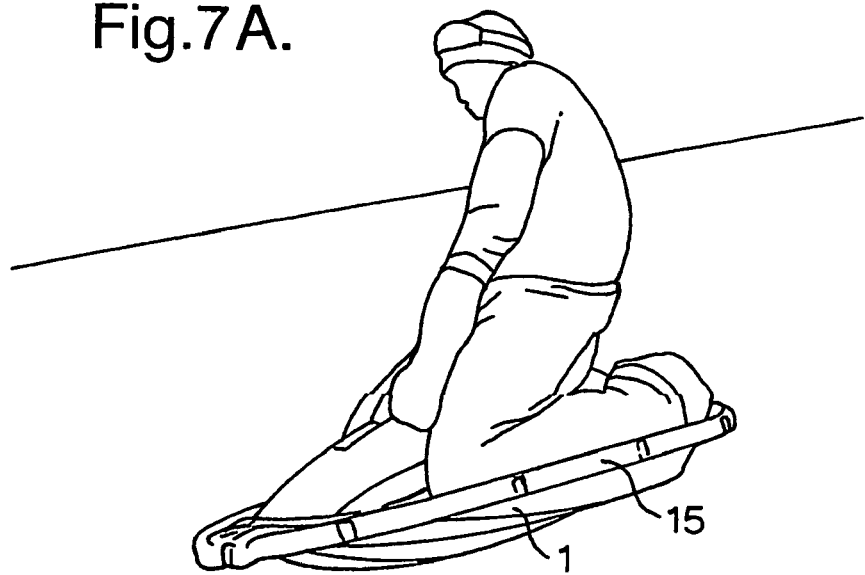
FIGS. 7A and 7B are two sketches illustrating the use of the device according to the invention.
Figure 7B:
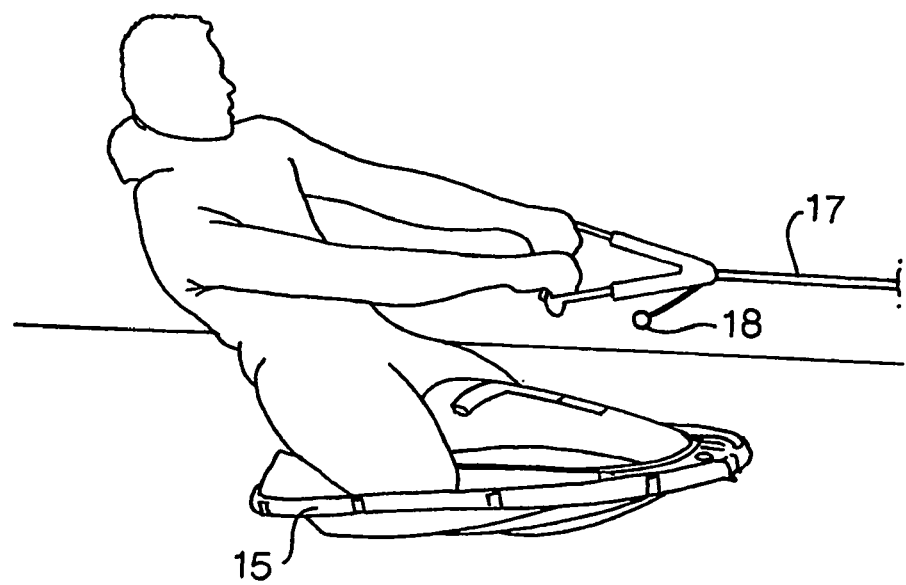

The use of the device according to the invention is schematically illustrated in FIGS. 7A and 7B, for use on snow surfaces or on water. It can be seen that the user sits on his knees and is supported by the air bag. To make a turn, he leans to the side. The board will thus tilt to the side and the steering runner enters into function. It is thus possible to steer the board in the desired direction. FIG. 7A illustrates the use on snow.

In a similar way, it can be seen from FIG. 7B how the board can be pulled behind a boat, the user then holding the towing rope after it has been released from the board. Here too, the user uses his body weight and displacement thereof to steer the board. Tests have shown that the board is easy to steer, even at high speeds of 30 knots or more.

Figure 6:
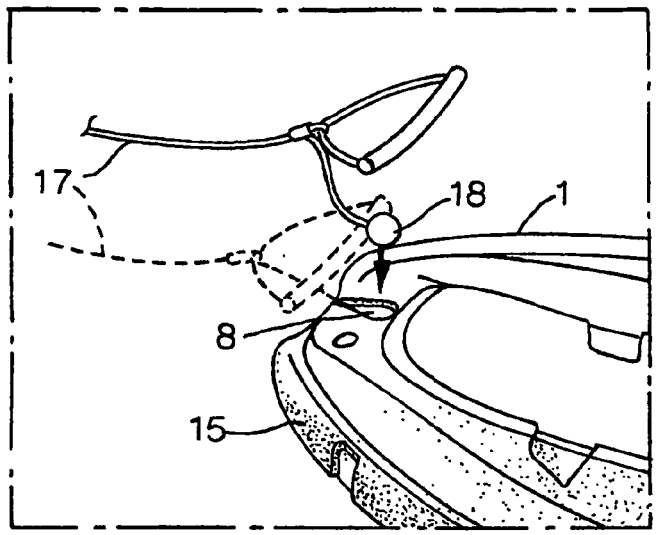
FIG. 6 is an illustration of the attachment of the towing line.

To get the board out of the water easily there is a special mechanism at the front of the board. This is illustrated in FIG. 6. The towing rope 17 is for this purpose made having a short offshoot having a ball-shaped enlargement at the end thereof, indicated by the reference numeral 18. At the front of the board there is a keyhole-shaped slot 8, and the knot or ball 18 on the towing rope offshoot is passed through the wide part of the keyhole slot 8 and locked in the narrow part. Before being towed, the board lies relatively deep in the water because the space between the top board and the bottom board is filled with water and because of the user's weight.

When the board is pulled into motion by the boat, it will be pulled up out of the water with great force that is exerted directly on the board. When the board has come up onto the surface, it will also very rapidly be emptied of water and the pulling force will no longer be so great on the board. The user can then start to pull the handle and the pulling rope towards him, thereby releasing the ball 18 from the groove 8 and thus gaining full control of the board so that he can handle it in the same way as when water-skiing. This mechanism could also be used on other articles that are towed and where a release of the towing line in motion is desired.

The invention is illustrated here by an expedient embodiment, but many of the details could vary within the scope of the invention. This applies to the fastening of the parts to each other, the detailed design of the elements and their assembly. The board could of course also be used without a cover. The resting faces for the feets could also be designed in other ways. Moreover, they are not essential for the use of the board, although they are advantageous. Many modifications are thus possible.

The invention claimed is:

1. A device for use in activity on a snow-covered surface or on a water surface, comprising a) a bottom board for contact with the surface, said bottom board having a longitudinally flat or slightly concavely curved central portion which extends from a curved front portion to a rear portion of the board, said bottom board further comprising side faces on each side of the central portion that are higher than the central portion, and yet further comprising longitudinal steering ribs or grooves arranged on the underside of the central portion, said steering ribs or grooves extending from the curved front portion to the rear portion; and b) a top board attached to the bottom board, said top board and the top board being joined together along their edges so as to define a hollow space between them, said top board comprising depressions along its sides adapted for receiving the legs of a user when in a riding position;

wherein:

c) the top board comprises a central region having an elongate, trough-shaped depression in which there is secured an airtight bag that is adapted to the depression, said airtight bag adapted to function as a seat for the user;

d) the central portion of the bottom board has longitudinal edges comprising auxiliary steering ribs arranged on each side of the central portion, said auxiliary steering ribs being shorter than the longitudinal steering ribs or grooves, said auxiliary steering ribs being flattened towards the forward and rear end areas of the central portion;

e) the side faces of the bottom board are flat, and are angled slightly upwards towards a substantially curved face part which forms a transition from the bottom board to the top board, each of said side faces being equipped with a steering runner projecting at an angle from the side face; and f) the device, at its front end is equipped with fastening means for a towing line or rope.

2. A device according to claim 1, wherein the board has openings into the hollow space between the top and bottom boards.

3. A device according to claim 1, wherein the depressions in the top board are padded.

4. A device according to claim 3, wherein the depressions in the top board are terminated by transverse resting faces for the feet.

5. A device according to claim 1, wherein the trough-shaped depression for the air bag is higher than the depressions for receiving the legs of the user.

6. A device according to claim 1, wherein the longitudinal axis of the steering runners forms an angle of between 1 and 10 degrees relative to the longitudinal edges of the central portion.

7. A device according to claim 1, wherein a padded cover is arranged over the airtight bag.

8. A device according to claim 1, wherein the airtight bag is inflatable via a valve.

9. A device according to claim 1, wherein the airtight bag is fastened by fastening means at its two ends, which are attachable to points of attachment on the bottom board and in addition is fastened to the top board by straps.

10. A device according to claim 9, wherein the end fastening means of the air bag comprises two rigid extension members having holes for cooperation with studs in the bottom board, and that the top board has slots in the ends of the central depression for feed-through of the extension members.

* * * * *